US012782920B2

(12) United States Patent
Clark et al.

(10) Patent No.: US 12,782,920 B2
(45) Date of Patent: Nov. 3, 2026

(54) VISION-BASED PROGRAMLESS ASSEMBLY

(71) Applicant: Bright Machines, Inc., San Francisco, CA (US)

(72) Inventors: Barrett Christopher Clark, Atlanta, GA (US); Emmanuel Gallo, Oakland, CA (US); Ali Shafiekhani, San Francisco, CA (US); Pattawong Pansodtee, Mountain View, CA (US); Michael Staub, San Francisco, CA (US); Murali Pappoppula, Fremont, CA (US)

(73) Assignee: Bright Machines, Inc., San Francisco, CA (US)

(*) Notice: Subject to any disclaimer, the term of this patent is extended or adjusted under 35 U.S.C. 154(b) by 65 days.

(21) Appl. No.: 18/641,297

(22) Filed: Apr. 19, 2024

(65) Prior Publication Data

US 2024/0353816 A1 Oct. 24, 2024

Related U.S. Application Data

(60) Provisional application No. 63/497,703, filed on Apr. 21, 2023.

(51) Int. Cl.
*B25J 13/08* (2006.01)
*B25J 9/16* (2006.01)
(Continued)

(52) U.S. Cl.
CPC ...... *G05B 19/41815* (2013.01); *B25J 9/1671* (2013.01); *B25J 9/1692* (2013.01);
(Continued)

(58) Field of Classification Search
CPC .... G05B 19/41815; G05B 2219/31031; G05B 2219/31053; G05B 2219/40033;
(Continued)

(56) References Cited

U.S. PATENT DOCUMENTS 7,403,835 B2 7/2008 Sandner et al.
7,996,113 B2 8/2011 Yuan et al.
(Continued)

FOREIGN PATENT DOCUMENTS

CN 106426158 A 2/2017
CN 108369533 A 8/2018
(Continued)

OTHER PUBLICATIONS

Alexander Perzylo, Intuitive Instruction of Industrial Robots: Semantic Process Descriptions for Small Lot Production, 2016, pp. 1-6. https://ieeexplore.ieee.org/stamp/stamp.jsp?tp=&arnumber=7759358 (Year: 2016).

(Continued)

*Primary Examiner* — Adam R Mott
*Assistant Examiner* — Heather J Keniry
(74) *Attorney, Agent, or Firm* — Nicholson De Vos Webster & Elliott LLP; Judith Szepesi

(57) ABSTRACT

A method of programless assembly of a device using a robotic cell comprising calibrating a robotic cell for generating a product model, the robotic cell including an end-of-arm camera and utilizing the robotic cell to generate the product model of the device for assembly. The method in one embodiment further comprises validating the product model using a partial assembly method and making the product model available for use by robotic cells.

20 Claims, 14 Drawing Sheets

(51) Int. Cl.
*B25J 19/02* (2006.01)
*G05B 19/418* (2006.01)
*G06V 10/25* (2022.01)
*G06V 10/70* (2022.01)

(52) U.S. Cl.
CPC .......... *B25J 13/085* (2013.01); *B25J 19/023* (2013.01); *G06V 10/25* (2022.01); *G06V 10/70* (2022.01); *G05B 2219/31031* (2013.01); *G06V 2201/06* (2022.01)

(58) Field of Classification Search
CPC .......... G05B 2219/40487; B25J 9/1671; B25J 9/1692; B25J 13/085; B25J 19/023; B25J 9/1687; B25J 9/1697; G06V 10/25; G06V 10/70; G06V 2201/06
See application file for complete search history.

(56) References Cited

U.S. PATENT DOCUMENTS

| | | | |
|---|---|---|---|
| 8,346,392 | B2 | 1/2013 | Walser et al. |
| 9,508,148 | B2 | 11/2016 | Zhang et al. |
| 9,643,314 | B2 | 5/2017 | Guerin et al. |
| 9,671,777 | B1 | 6/2017 | Aichele et al. |
| 9,707,680 | B1 | 7/2017 | Jessen et al. |
| 9,796,083 | B2 | 10/2017 | Atohira et al. |
| 9,811,074 | B1 | 11/2017 | Aichele et al. |
| 9,840,007 | B1 | 12/2017 | Kuffner |
| 9,844,882 | B2 | 12/2017 | Takizawa et al. |
| 9,971,914 | B2 | 5/2018 | Maturana et al. |
| 10,279,480 | B1 | 5/2019 | Holson et al. |
| 10,456,915 | B1 | 10/2019 | Diankov |
| 10,475,240 | B2 | 11/2019 | Evans et al. |
| 10,576,635 | B2 | 3/2020 | Ogawa et al. |
| 10,596,700 | B2 | 3/2020 | Corkum et al. |
| 10,773,386 | B2 | 9/2020 | Yamauchi et al. |
| 10,782,668 | B2 | 9/2020 | Bank et al. |
| 10,875,176 | B2 | 12/2020 | Radrich et al. |
| 11,023,934 | B1 | 6/2021 | Jacobs et al. |
| 11,209,798 | B1 | 12/2021 | Michalowski et al. |
| 2006/0107507 | A1 | 5/2006 | Brose et al. |
| 2007/0150100 | A1 | 6/2007 | Saraliev |
| 2008/0013825 | A1 | 1/2008 | Nagatsuka et al. |
| 2009/0118864 | A1 | 5/2009 | Eldridge et al. |
| 2012/0265345 | A1 | 10/2012 | Nakahara |
| 2014/0046635 | A1 | 2/2014 | Kersh et al. |
| 2014/0148949 | A1 | 5/2014 | Graca et al. |
| 2014/0297244 | A1 | 10/2014 | Maturana et al. |
| 2015/0134317 | A1 | 5/2015 | Maturana et al. |
| 2015/0239127 | A1 | 8/2015 | Barajas et al. |
| 2015/0321352 | A1 | 11/2015 | Debain et al. |
| 2016/0239013 | A1 | 8/2016 | Troy et al. |
| 2016/0243704 | A1 | 8/2016 | Vakanski et al. |
| 2017/0079725 | A1 | 3/2017 | Hoffman et al. |
| 2017/0097628 | A1 | 4/2017 | Fadlovich et al. |
| 2018/0029232 | A1 | 2/2018 | Ouchi et al. |
| 2018/0126553 | A1 | 5/2018 | Corkum et al. |
| 2018/0304467 | A1 | 10/2018 | Matsuura et al. |
| 2018/0315237 | A1 | 11/2018 | Byers et al. |
| 2018/0316729 | A1 | 11/2018 | Chauvet et al. |
| 2018/0356895 | A1 | 12/2018 | Dailey et al. |
| 2019/0001573 | A1 | 1/2019 | Gulbrandsen et al. |
| 2019/0015163 | A1 | 1/2019 | Abhari et al. |
| 2019/0056928 | A1 | 2/2019 | Smal et al. |
| 2019/0084160 | A1 | 3/2019 | Liu et al. |
| 2019/0254754 | A1 | 8/2019 | Johnson et al. |
| 2019/0280405 | A1 | 9/2019 | Iwai et al. |
| 2019/0291277 | A1 | 9/2019 | Oleynik |
| 2019/0308320 | A1 | 10/2019 | Konishi |
| 2019/0339966 | A1 | 11/2019 | Moondhra et al. |
| 2019/0339967 | A1 | 11/2019 | Moondhra et al. |
| 2019/0350685 | A1 | 11/2019 | Saghatchi et al. |
| 2019/0380794 | A1 | 12/2019 | Al et al. |
| 2019/0389060 | A1 | 12/2019 | Roy Chaudhuri et al. |
| 2020/0016758 | A1 | 1/2020 | Keller et al. |
| 2020/0024853 | A1 | 1/2020 | Furrer et al. |
| 2020/0030979 | A1 | 1/2020 | Bank et al. |
| 2020/0078948 | A1 | 3/2020 | Krause et al. |
| 2020/0086483 | A1 | 3/2020 | Li et al. |
| 2020/0147794 | A1 | 5/2020 | Kerrick et al. |
| 2020/0156251 | A1 | 5/2020 | Huang et al. |
| 2020/0159648 | A1 | 5/2020 | Ghare et al. |
| 2020/0171668 | A1 | 6/2020 | Lin et al. |
| 2020/0171671 | A1 | 6/2020 | Huang et al. |
| 2020/0206913 | A1 | 7/2020 | Kaehler |
| 2020/0206919 | A1 | 7/2020 | Nakayama et al. |
| 2020/0225655 | A1 | 7/2020 | Cella et al. |
| 2020/0265329 | A1 | 8/2020 | Thomsen et al. |
| 2020/0276714 | A1 | 9/2020 | Declerck et al. |
| 2020/0301510 | A1 | 9/2020 | Birchfield et al. |
| 2020/0306977 | A1 | 10/2020 | Islam et al. |
| 2020/0310394 | A1 | 10/2020 | Wouhaybi et al. |
| 2020/0342067 | A1 | 10/2020 | Yu et al. |
| 2020/0398435 | A1 | 12/2020 | Okura et al. |
| 2021/0018903 | A1 | 1/2021 | Muneta et al. |
| 2021/0046639 | A1 | 2/2021 | Ravi et al. |
| 2021/0096824 | A1 | 4/2021 | Stump et al. |
| 2021/0101282 | A1 | 4/2021 | Yoneyama |
| 2021/0133670 | A1 | 5/2021 | Cella et al. |
| 2021/0138651 | A1 | 5/2021 | Mcgregor et al. |
| 2021/0141870 | A1 | 5/2021 | Mcgregor et al. |
| 2021/0178575 | A1 | 6/2021 | Riek et al. |
| 2021/0323167 | A1 | 10/2021 | Hemes et al. |
| 2021/0369353 | A1 | 12/2021 | Nikou et al. |
| 2021/0375439 | A1 | 12/2021 | Mckinnon et al. |
| 2022/0147026 | A1* | 5/2022 | Poelman ................ B25J 9/1692 |
| 2022/0219327 | A1 | 7/2022 | Riek et al. |
| 2023/0019873 | A1 | 1/2023 | Landon et al. |
| 2023/0286145 | A1* | 9/2023 | Liu ........................ B25J 9/1687 |
| 2024/0017408 | A1* | 1/2024 | Attar ...................... B25J 9/1661 |
| 2025/0262700 | A1* | 8/2025 | Pagnon ................ B23Q 3/1552 |

FOREIGN PATENT DOCUMENTS

| | | | |
|---|---|---|---|
| CN | 108427390 | A | 8/2018 |
| CN | 110795874 | A | 2/2020 |
| EP | 2498156 | A2 | 9/2012 |
| EP | 2871544 | A2 | 5/2015 |
| EP | 3476545 | A1 | 5/2019 |
| EP | 3476549 | A1 | 5/2019 |
| EP | 3705239 | A1 | 9/2020 |
| JP | 2006-003236 | A | 1/2006 |
| JP | 2018-158439 | A | 10/2018 |
| WO | 2012/027541 | A1 | 3/2012 |
| WO | 2018/176025 | A1 | 9/2018 |
| WO | 2018/196232 | A1 | 11/2018 |
| WO | 2019/064916 | A1 | 4/2019 |
| WO | 2019/113618 | A1 | 6/2019 |
| WO | 2019/113619 | A1 | 6/2019 |
| WO | 2020/053083 | A1 | 3/2020 |
| WO | 2020/190272 | A1 | 9/2020 |

OTHER PUBLICATIONS

Alexei Vassiliev, Designing the Built-In Microcontroller Control Systems of Executive Robotic Devices Using the Digital Twins Technology, 2019, pp. 1-5. https://ieeexplore.ieee.org/stamp/stamp.jsp?tp=&arnumber=8843814 (Year: 2019).

Fuchs et al., "Cooperative bin-picking with Time-of-Flight camera and impedance controlled DLR lightweight robot III", Intelligent Robots and Systems (IROS), 2010 IEEE/RSJ International Conference on, IEEE, Oct. 18, 2010, pp. 4862-4867.

Garrett Thomas, Learning Robotic Assembly from CAD, 2018, pp. 1-8. https://arxiv.org/pdf/1803.07635.pdf (Year: 2018).

Hatem Fakhurldeen, CARA system Architecture—A Click and Assemble Robotic Assembly System, 2019, pp. 5830-5835. https://ieeexplore.ieee.org/stamp/stamp.jsp?tp=&arnumber=8794114 (Year: 2019).

Igor Azkarate Fernandez, Virtual commissioning of a robotic cell: an educational case study, 2019, pp. 1-6. https://ieeexplore.ieee.org/stamp/stamp.jsp?tp=&arnumber=8869373 (Year: 2019).

(56) References Cited

OTHER PUBLICATIONS

International Search Report and Written Opinion, PCT App. No. PCT/US2024/025586, Jul. 25, 2024, 12 pages.
Lu et al., An on-line relative position and orientation error calibration methodology for workcell robot operations, Robotics and Computer Integrated Manufacturing, vol. 13, No. 2, Jun. 1, 1997, pp. 89-99.
Maragkos et al., “Virtual Reality Assisted Robot Programming for Human Collaboration”, 29th International Conference on Flexible Automation and Intelligent Manufacturing, Procedia Manufacturing, vol. 38, 2019, pp. 1697-1704.
Marc Priggemeyer, Interactive calibration and visual programming of reconfigurable robotic workcells, 2018, pp. 1936-1401. https://ieeexplore.ieee.org/document/8452707 (Year: 2018).
Middelplaats, L.N.M., “Automatic Extrinsic Calibration and Workspace Mapping : Algorithms to Shorten the Setup time of Camera-guided Industrial Robots”, Delft University of Technology, Jun. 11, 2014, pp. 1-144.
Ming-Yu et al., “Fast object localization and pose estimation in heavy clutter for robotic bin picking”, The International Journal of Robotics Research, [Online] vol. 31, No. 8, Jul. 2012 (Jul. 2012), pp. 951-973, XP055975134,.
Niki Kousi, Digital twin for adaption of robots’ behavior in flexible robotic assembly lines, 2019, pp. 121-127. https://www.researchgate.net/publication/330669566_Digital_twin_for_adaptation_of_robots%27_behavior_in_flexible_robotic_assembly_lines (Year: 2019).
Shure Loren: “Carving a Dinosaur”, Dec. 16, 2009 (Dec. 16, 2009), pp. 1-9, XP055975843.
Solhaug Linnerud, CAD-based system for programming of robotic assembly processes with human-in-the-loop, Jul. 2019, pp. 2303-2308. https://ieeexplore.ieee.org/stamp/stamp.jsp?arnumber=8781385 (Year: 2019).
Stefan Profanter, A Hardware-Agnostic OPC UA Skill Model for Robot Manipulators and Tools, 2019, pp. 1061-1068. https://ieeexplore.ieee.org/stamp/stamp.jsp?tp=&arnumber=8869205&isnumber=8868236 (Year: 2019).
Madimir Kuliaev, Towards Product Centric Manufacturing: From Digital Twins to Product Assembly, May 2019, pp. 164-170. https://ieeexplore.ieee.org/stamp/stamp.jsp?tp=&arnumber=8972137 (Year: 2019).
Wikipedia, “Digital Twin”, Available Online at <https://en.wikipedia.org/w/index.php?t%20itle=Digital%20twin&oldid=924505803#Industry%20-level%20dynam,cs>, Nov. 4, 2019, 16 pages.
International Preliminary Report on Patentability, PCT App. No. PCT/US2024/025586, Jul. 29, 2025, 21 pages.
Second Written Opinion, PCT App. No. PCT/US2024/025586, Mar. 28, 2025, 10 pages.

* cited by examiner

VISION-BASED PROGRAMLESS ASSEMBLY

RELATED APPLICATION

The present application claims priority to U.S. Provisional Application 63/497,703, filed on Apr. 21, 2023, and incorporates that application by reference in its entirety.

FIELD

The present invention relates to robotic assembly and more particularly to vision-based programless robotic assembly.

BACKGROUND

Automation systems often have configuration data that controls their behavior (including settings and software). For example, screwdriver spin speeds, oven thermostat controls, target robot coordinates, software control programs, etc. Automation systems often have many different devices (ex. robots, conveyance systems, part feeders, assembly tools, etc.) each with their own configuration data. The normal process of engineering a solution involves designing and managing the configuration data (including software and operating systems) of many devices. Managing such versions during the debugging and process optimization phases is time consuming and error prone. Deploying such solutions to robotic cells is often time consuming and requires expert guidance.

To deploy an assembly program for a new part to a robotic system, expert technicians and programmers often need to spend a long time setting up the programs and recipes. This is time consuming and expensive. It also makes the use of robotic assembly systems for small projects financially unviable.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1A:
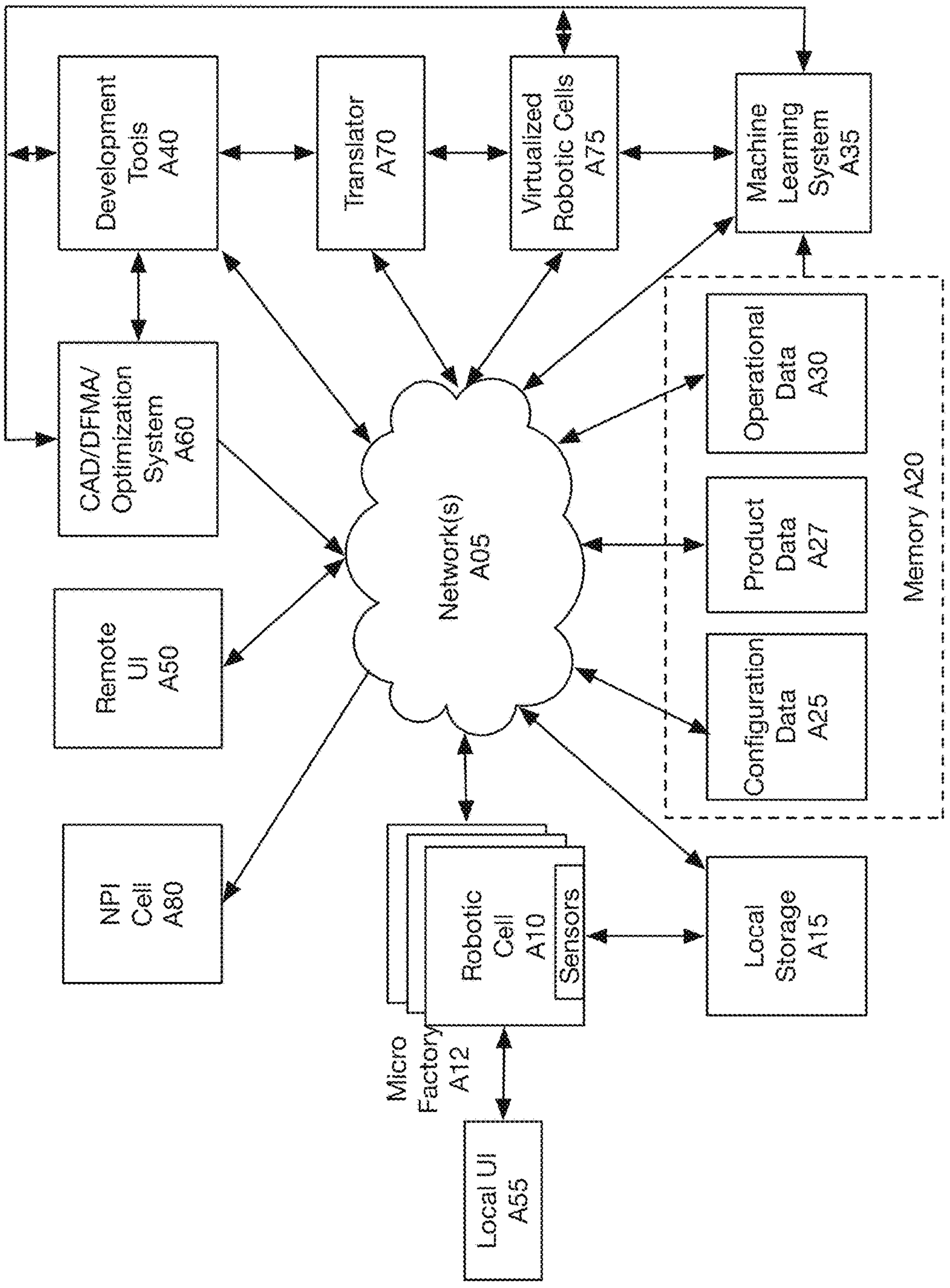
FIG. 1A is a block diagram of one embodiment of the system which may provide the automatic configuration for new product introduction.

The present system is designed to build smart automation applications for robotic systems. The smart automation system is designed to be easy to deploy and use and is configurable with minimal human input. In one embodiment, the automated application is based on computer vision and photogrammetry. In one embodiment, an off-the shelf camera may be used. In some embodiments, the sensor systems may include one or more cameras, depth sensors, or other types of sensors. In one embodiment, the system utilizes a calibrated vision-guided robot to generate an offline 3D model of a reference product for assembly, and utilizes that 3D model to automatically generate a product model, an assembly recipe, and a validation recipe to enable assembly of that product line automatically, by any robotic cell configured with the product model. The system is able to support a new type of device for assembly, using the same end of arm tool and hardware, without manual design of an assembly recipe. The system, in one embodiment, generates a product model using machine learning. The system, in one embodiment, generates an inspection model using machine learning.

In one embodiment, the system utilizes a specially designed new product introduction (NPI) robotic cell which includes a plurality of cameras and/or sensors, including a sensor at the end of arm, to evaluate a new product for assembly or disassembly. The system utilizes the NPI cell to generate a sparse 3D point model of the device and computes the locations of components from a reference point. In one embodiment, the system uses vision in combination with a computer aided design (CAD) data for the product. In one embodiment, the system is designed to assemble a device comprising a product base, which includes one or more components. The components may be sockets for dual inline memory modules (DIMMs), sockets for central processing units (CPUs), heat sink assembly to receive a heat sink. In addition to the product, there are elements such as DIMMs, CPUs, and heat sinks for insertion into the components on the device.

The system then creates a recipe, in one embodiment, for the assembly of the product based on the product model. In one embodiment, an automatic verification program partially inserts the elements into the appropriate components (e.g., Dual In-Line Memory Modules (DIMMs) are partially inserted into DIMM sockets, confirming correct positioning and force). In one embodiment, additional sensors may be used for validating the model. For a component insertion model, a force signal during a partial insertion, or DIP test, may be used as part of the validation. For other devices, another mechanism may be used.

The generation of the verification program is also based on the identification of the positions of the components on the device. In one embodiment, the product model may be transferred to any robotic cell, which can then use that data to assemble any number of devices. This eases new product introduction. It also allows a zero-downtime changeover to any product set that has been set up and uses the same end of arm elements. Because the system relies on machine learning and a calibrated vision guided robotic cell, it is tolerant to part and environmental variations, and can use off-the-shelf parts such as cameras, sensors, and/or lights.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized, and that logical, mechanical, electrical, functional, and other changes may be made without departing from the scope of the present invention. The following detailed description is, therefore, not to be taken in a limiting sense, and the scope of the present invention is defined only by the appended claims.

FIG. 1A is a simplified block diagram of one embodiment of the system which may provide the automatic configuration for new product introduction.

In one embodiment, robotic cells A10 include one or more individual robotic cells which together form the software defined manufacturing line, or micro factory. In one embodiment, individual robotic cells A10 may be linked via conveyors, and reverse conveyors, so that a single item being manufactured or assembled through the micro factory passes through multiple robotic cells A10 (or multiple times through one or more cells A10). The robotic cells A10 may provide manufacturing, assembly, inspection, and/or testing of products. Thus, a robotic cell A10 may be an inspection system such as an automatic optical inspection (AOI) machine, or an assembly system such as a system with a robotic arm to insert a screw, or a manufacturing system such as a CNC machine. Each robotic cell A10, in one embodiment, includes a robotic arm with 6 degrees of freedom, as well as one or more cameras/sensors, to detect the position of the robotic arm as well as any element in the workspace of the robotic cell. The robotic arm includes an end-of-arm which is designed to accept an end-of-arm tool. The end of arm tool may be used in assembly of a product, and may include for example screw drivers, grippers, hammers, and other tools.

In one embodiment, the robotic cells A10 are controlled by software. In one embodiment, the configuration and control data for the robotic cells A10 are applied to the cell from memory A20. In one embodiment, the memory A20 may be part of a remote system, coupled to the robotic cells A10 via network A05. The configuration data A25 defines the configuration for each robotic cell A10 and the manufacturing line. The configuration data can include software configuration and any other configuration that is controllable through software. For example, a home thermostat has a configuration (the temperature target set-point) which is not itself software, but in some thermostats that set-point configuration can be controlled/modified via software control. Thus, the configuration management can encompass data that is controllable through software, even if it controls hardware settings. Configuration data A25 may also include calibration data for the robotic cells.

In one embodiment, configuration data A25 may include other configuration elements that may be controlled through software, such as setpoints, pressure, torque, and other settings. The robotic cells A10 collect operational data while being calibrated, tested, or used. This operational data A30 is stored in memory A20 and used by machine learning system A35.

Product data A27 in one embodiment includes product model data for one or more product models that may be assembled by the robotic cells A10. The product data A27 in one embodiment includes the configuration data for the product and the recipe specifying the assembly process for the product. In one embodiment, the product data A27 also includes validation recipes.

In one embodiment, local storage A15 provides a local memory for the configuration data A25 and product data A27, for the robotic cell, as well as operational data produced by the robotic cell while it is in use. Local storage A15 in one embodiment acts as a buffer for memory A20. In one embodiment, if the robotic cell A10 becomes disconnected from the network A05, it may continue to operate and collect real time operational data, using local storage A15.

In one embodiment, because the cells are software configured, a single robotic cell A10 may perform multiple stages in the manufacturing process and may be reconfigured during the manufacturing process. In one embodiment, this also enables the substitution of robotic cells A10 in a micro factory during manufacturing without extensive manual reconfiguration. In fact, extensive reconfiguration may be done through automated methods under software control. In one embodiment, this also permits the addition of cells into a micro factory.

The system in one embodiment includes a machine learning system A35 to train the system, as will be described below. In one embodiment, recipes and product models may be tested on a virtualized robotic cell A75, prior to being distributed to memory A20 and physical robotic cells A10.

In one embodiment, new product introduction (NPI) cell A80 is used to build the product model for a new device. In one embodiment, the NPI cell A80 is similar or identical to robotic cells A10. In one embodiment, the NPI cell A80 has camera/sensors on the end-of-arm in addition to other sensors.

Figure 1B:
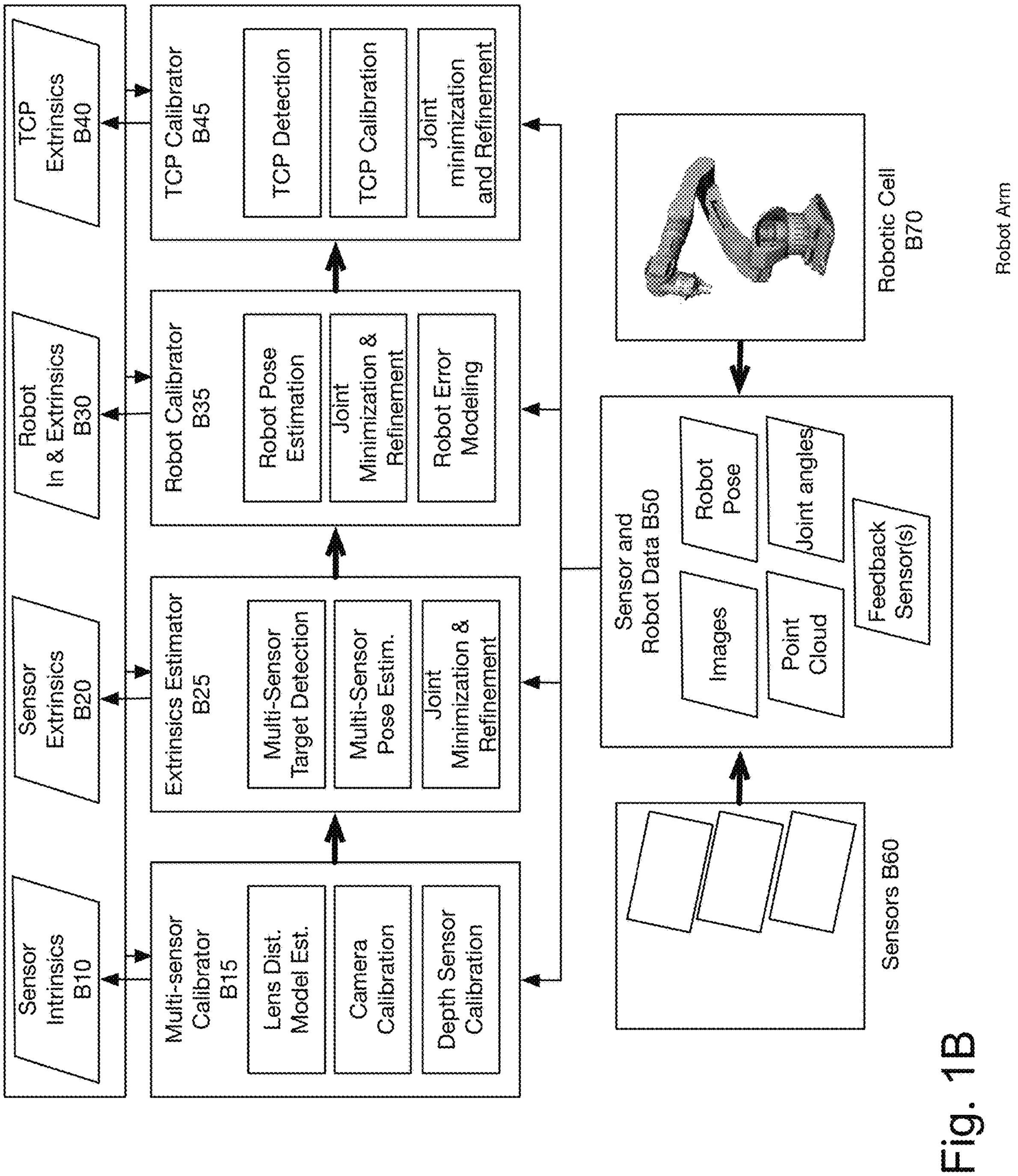
FIG. 1B is a block diagram of one embodiment of calibration elements for a robotic arm.

FIG. 1B is a block diagram of one embodiment of calibration elements for a robotic arm. The calibration elements in one embodiment include sensor intrinsics B10, sensor extrinsics B20, robot intrinsics and extrinsics B30, and tool center point (TCP) extrinsics B40.

In one embodiment, the sensor extrinsics B10 receive data from multi-sensor calibration B15. Multisensor calibration B15 provides calibration of the camera, camera lens distance model, and depth sensor calibration. In one embodiment, additional sensors may also be calibrated. In one embodiment, standard calibration methods are used, as discussed in more detail below.

The sensor extrinsics B20 receive data from extrinsics estimation B25. Extrinsics estimation B25 determine the extrinsic parameters, which represent a location of the sensor in the world, as opposed to the intrinsic parameters which represent the characteristics of the sensor itself, for a camera the optical center and focal length. The extrinsics estimation B25 includes multi-sensor target detection, multi-sensor pose estimation, and joint minimization and refinement logics, in one embodiment.

The robot intrinsics and extrinsics B30 is based on robot calibration B35. Robot calibration B35, in one embodiment includes robot pose estimation, joint minimization and refinement, and robot error modeling.

The TCP extrinsics B40 use data from TCP calibrator B45. The TCP calibration B45 in one embodiment includes TCP detection, TCP calibration, and joint minimization and refinement.

These elements receive data from sensor and robot data B50. The sensor and robot data B50 receives data from sensors B60 and the robotic cell B70.

The sensor and robot data B50 in one embodiment receives data from the sensors B60 and calculates image data, robot pose data, joint angles. In one embodiment, there are one or more feedback sensors which can be used to provide feedback on the positioning. In one embodiment, a feedback sensor may be a force sensor, to provide force data, when attempting to insert or partially insert a component, during training or in use. In one embodiment, the feedback sensor may be an endoscopic camera on the end-of-arm element to show the position of the socket. In one embodiment, the sensor and robot data B50 utilizes a point cloud for determining the position of elements, in one embodiment.

Figure 1C:
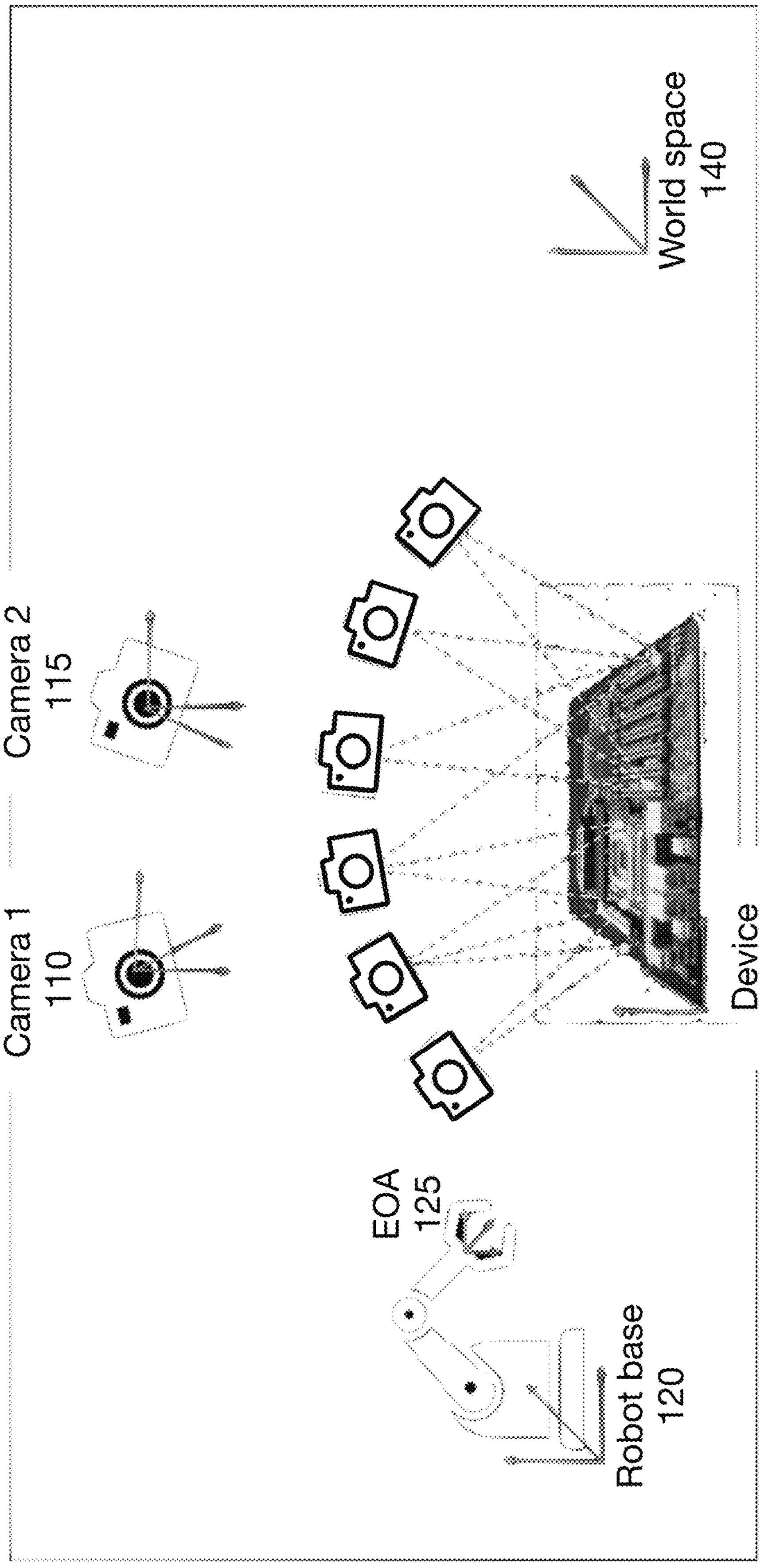
FIG. 1C is an image illustrating one embodiment of using the sensors to localize elements on the product base for building the product model.

FIG. 1C is an image illustrating one embodiment of using the sensors to localize elements on the product base, or device 130, for building the product model. The localized elements define the world space 140. The calibration system in one embodiment utilizes one or more cameras and/or other sensors to obtain image data. The sensors may include a depth camera, a LIDAR sensor, or other data. The image data may include 2D images, depth data, X-ray data, or a combination of data types. In one embodiment two cameras 110, 115 are used. The system takes multiple images, with the cameras in different positions and/or the device 130 in different positions. The system localizes the device 130, and the components on the device 130, the robot 120, and the robot end of arm (EOA) 125. In one embodiment, the system defines a "world space" which is a coordinate system from which each of the components on the base is localized. In one embodiment, the localization for the device 130 may be based on a particular component on the base, such as a DIMM socket. In one embodiment, a fiducial may be placed on the particular component used to define the origin point.

Figure 1D:
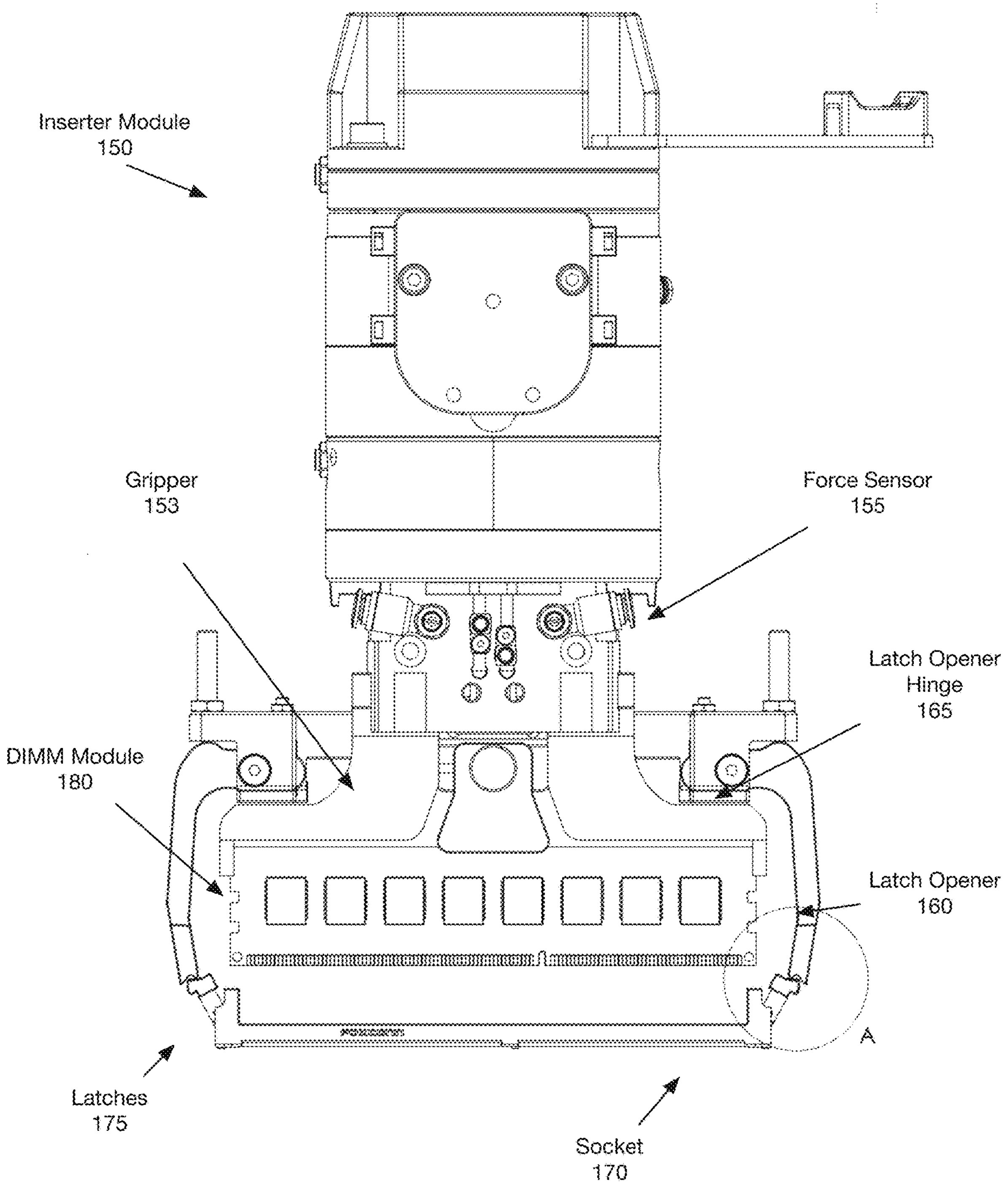
FIG. 1D is one embodiment of a DIMM inserter.

FIG. 1D illustrates an exemplary end of arm tool for inserting a DIMM into a socket. The end of arm tool is an inserter module 150 which includes gripper 153 to grab a DIMM module 180. For insertion, the latch openers 160 open the DIMM socket latches 175, and the inserter module 150 pushes down to seat the DIMM module. The latch opener 160 in one embodiment is coupled via latch opener hinge 165 to the DIMM inserter body. For a DIP test, or partial insertion to validate the alignment, the force sensor 155 is used to return a force signal. The force signal is used to confirm whether the navigation offset is accurate, e.g., whether the insertion is correctly aligned. The force signal in one embodiment can also be used as feedback while robot is searching for the correct location. The force signal in one embodiment can also be used to correct the estimated vision pose.

Figure 1E:
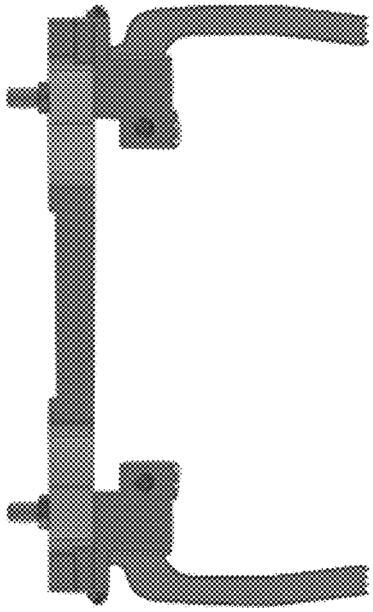
FIGS. 1E and 1F illustrate one embodiment of the latch opening component with an embedded camera.
Figure 1F:
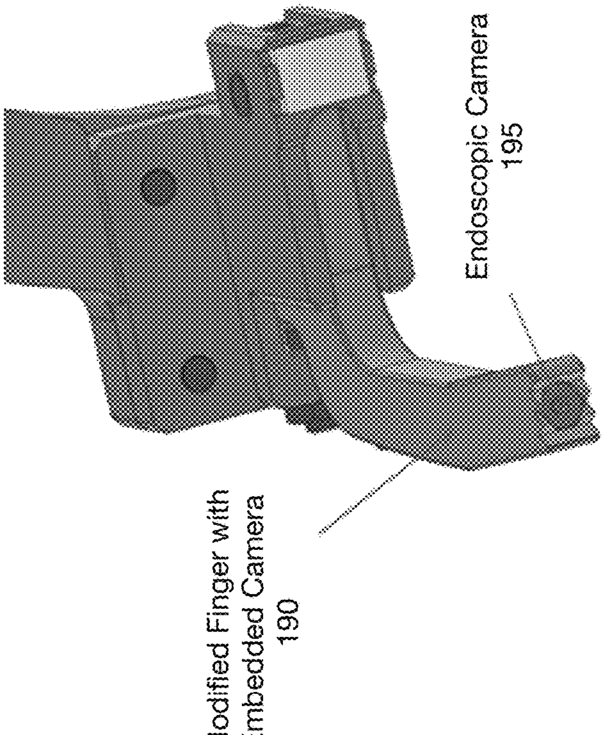

As shown in FIGS. 1E and 1F, the latch opening component 160 in one embodiment includes an endoscopic camera 195 at the end of the modified finger 190 of the latch opening component 160. The camera may be on one or both sides. The micro-adjustments for positioning may be made based on the data from the endoscopic camera 195, in one embodiment.

Figure 2A:
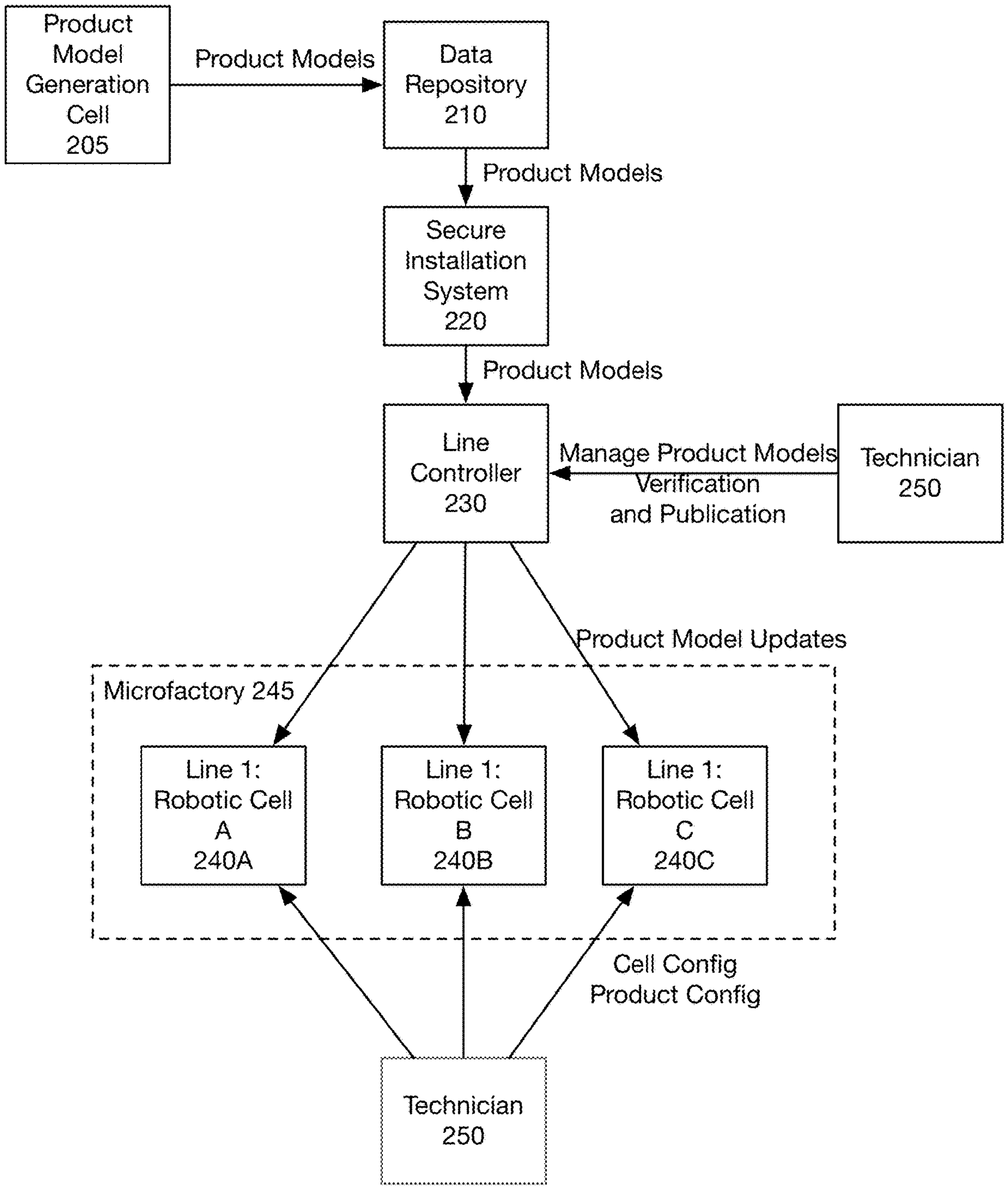
FIG. 2A is a block diagram of one embodiment of the system.

FIG. 2A is a block diagram of one embodiment of the system. The product model generation cell 205 is used to generate a product model which includes the configuration of the device to be assembled. In one embodiment, the product model may include the recipe which is used to assemble the devices. In another embodiment, the product model includes data that allows recipe generation downstream. The data repository 210 or memory stores the product models.

In one embodiment, a secure installation system 220 is used to distribute the validated product models to robotic cells. In one embodiment, the secure installation system 220 provides requested product models to a line controller 230. A line controller 230 may control a single robotic cell, a microfactory, multiple microfactories in a single location, or microfactories and/or robotic cells across multiple locations.

The line controller 230 configures the one or more robotic cells 240A-C that it controls. In one embodiment, the robotic cells may be part of a microfactory 245. Each of the robotic cells 240A, 240B, 240C, may perform the same or different actions in assembling a device. Because the assembly of a device may take one or more robotic cells, the line controller 230 provides the relevant portions of the product models, and product model updates, to the appropriate robotic cell (s). In one embodiment, a technician 250 manages the product models at the line controller 230. The technician 250 also provides cell configuration and product configuration data to the individual robotic cells in the microfactory 245, in one embodiment. In another embodiment, the system may operate without a technician, with automated distribution of the configuration data.

Figure 2B:
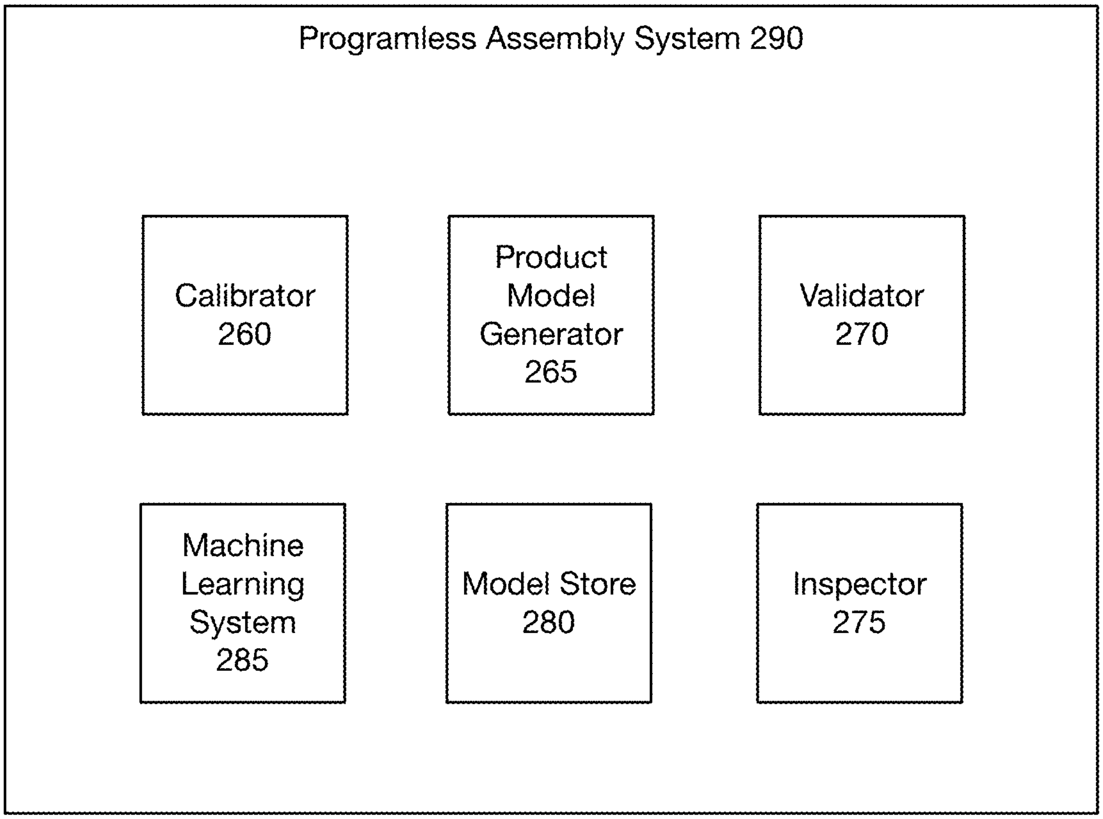
FIG. 2B is a block diagram of one embodiment of the system.

FIG. 2B is a block diagram of one embodiment of the system. The system 290 in one embodiment is implemented within one or more processors and utilizes machine learning system 285 as will be described below. The system in one embodiment includes a calibrator 260, designed to calibrate sensors in the robotic cell. In one embodiment, calibrator 260 calibrates cameras, depth sensors, and TCP.

The system further includes a product model generator 265 to generate the product model of the device for assembly. The product model in one embodiment is the base onto which the other components are assembled. In one embodiment, the product model includes a plurality of regions of interest. In one embodiment, the product model generator 265 utilizes a reference point on the device, for computing the locations of components. In one embodiment, the reference point comprises a fiducial, which provides a position and a size indication.

The system further includes a product model validator 270 to validate the product model. In one embodiment, the validator 270 uses a computer aided design (CAD) model of the device to validate the product model. In one embodiment, the validator 270 also uses a partial assembly method to verify robustness of the product model. The system further includes an inspector 275, to perform an inspection of the product model. In one embodiment, the inspector defines regions of interest and utilizes images to verify the predictions of the system. In one embodiment, some or all of the above systems may take advantage of machine learning systems, as will be described in more detail below.

The system in one embodiment also includes a model store 280 to make the product model available for use by robotic cells for navigation, validation, and/or inspection.

Figure 3:
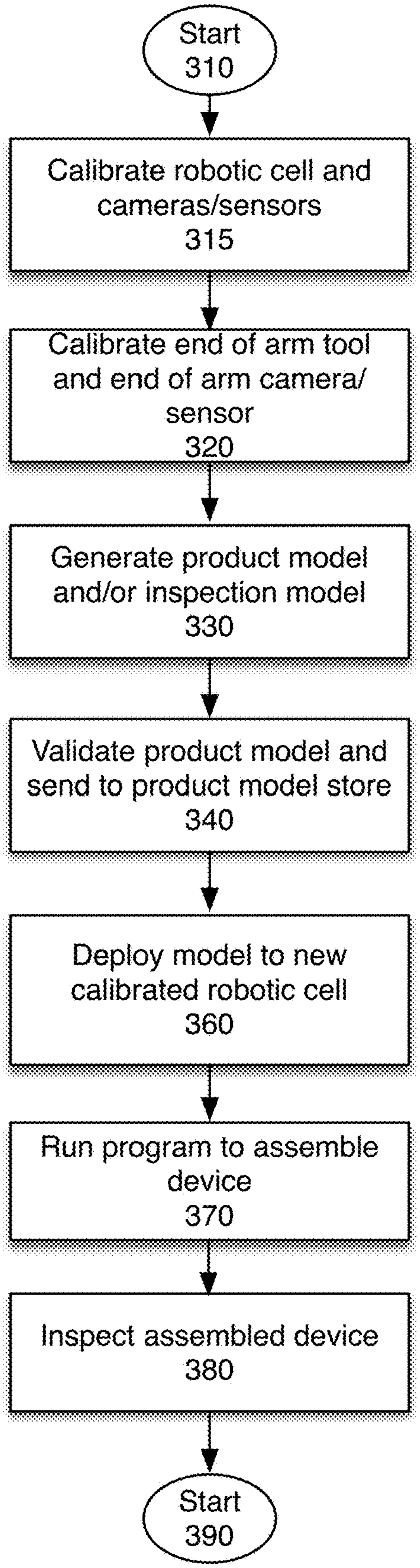
FIG. 3 is an overview flowchart of generating the vision-based programless assembly system.

FIG. 3 is an overview flowchart of generating the vision-based programless assembly system. The process starts at block 310.

At block 315, the robotic cell is calibrated. In one embodiment, calibration includes calibration of the cameras and sensors in the robotic cell. In one embodiment, calibration also includes identifying an origin point for the robotic cell, from which measurements and positions are determined. In one embodiment, the robotic cell calibration utilizes the auto-calibration process described in co-pending application Ser. No. 17/454,217 entitled "Method and Apparatus for Improved Auto-Calibration of a Robotic Cell."

At block 320, the end of arm tool and end of arm camera/sensor are calibrated. In one embodiment, the tool center point (TCP) is identified. In one embodiment, the TCP calculation described in co-pending application Ser.

No. 17/812,154 entitled "Method and Apparatus for Vision-Based Tool Localization" is used.

At block 330, the product model and/or inspection model is generated. The product model is based on a 3D model of the reference part of the device. For example, for a server, the device is the circuit board including components for assembly into, which may include sockets for one or more dual inline memory modules (DIMMs), a central processing unit (CPU), other processing units such as graphical processing units (GPUs), heat sinks, and other relevant elements. In one embodiment, the 3D model of the reference part may be a CAD design of the component. In one embodiment, the 3D model of the reference part is generated from the CAD design. In one embodiment, the 3D model may be a simplified model. In one embodiment, the 3D model may be a sparse point cloud. In one embodiment, the product model may include only the relevant portions of the component.

At block 340, the product model is validated. In one embodiment, product validation includes a partial assembly process, in which the appropriate component is partially inserted into each of the identified component locations. In one embodiment, the partial insertion is designed to use a level of power that does not damage either the component or the location where it is inserted if there is a mismatch between the parts. In one embodiment, a force sensor is used in the insertion to verify that the partial insertion is successful. In another embodiment, data from endoscopic camera embedded within a part of the end-of-arm tool is used to verify that the partial insertion is successful. Once the product model has been validated, it is sent to the product model store, in one embodiment. This makes it available for deployment to microfactory assembly lines.

At block 360, the product model is deployed to a new calibrated robotic cell. At block 370, the program is run to assemble a device. In one embodiment, the program provides the macro pose estimation, and one or more feedback sensors are used to do micro adjustments on the fly. In one embodiment, the feedback sensors may include a force sensor to sense the level of force on insertion. In one embodiment, the feedback sensors may include an embedded endoscopic camera.

The system then runs an inspection protocol to confirm that the assembly was successful, at block 380. In one embodiment, this process may be run as long as there are devices to assemble. In one embodiment, as new devices come into the system for assembly, the feedback sensor(s) may be used to adjust for vision drift over time. The detection by the feedback sensor may be used to adjust the navigation offsets for subsequent devices. The process ends at block 390.

Figure 4:
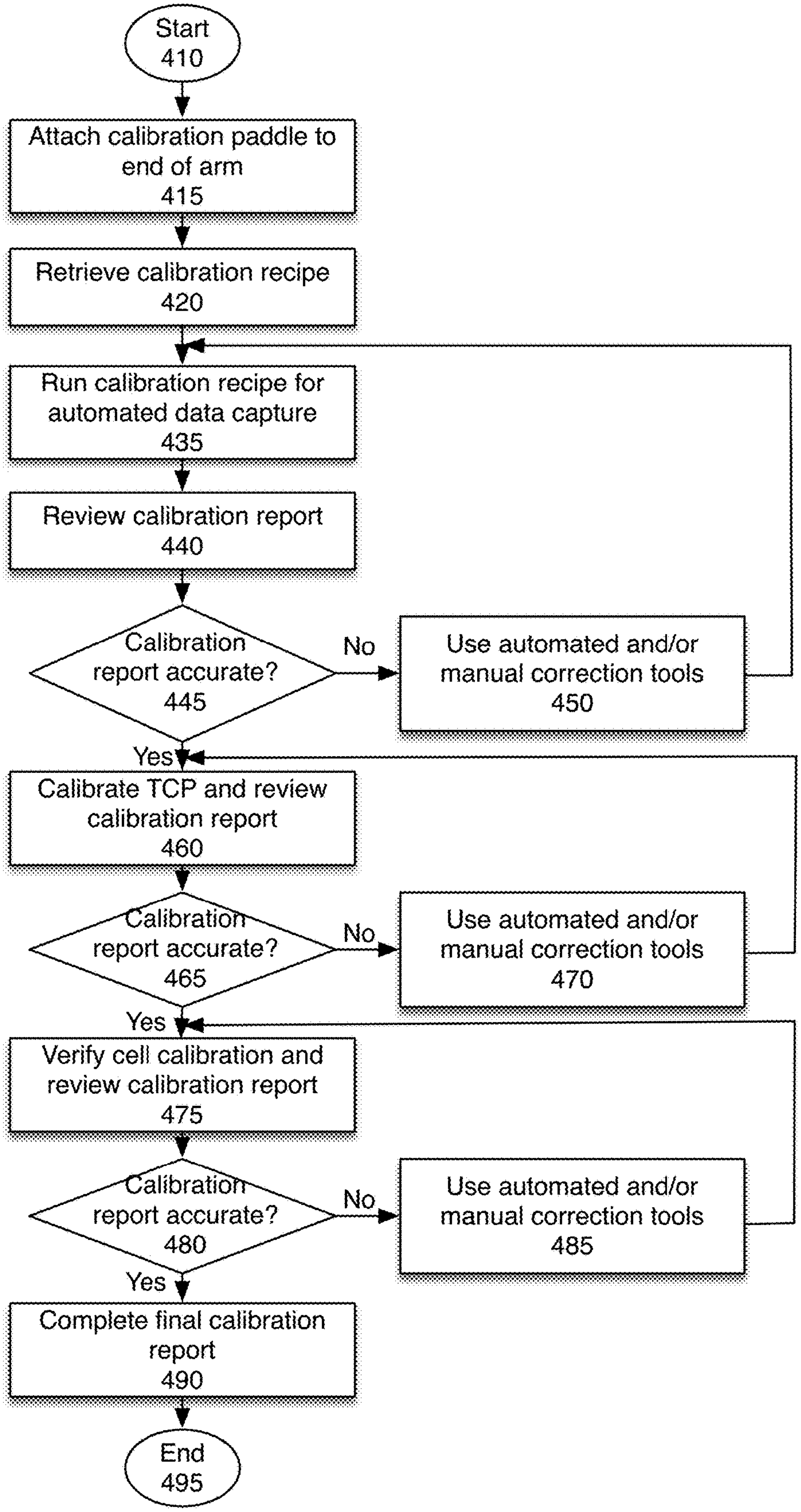
FIG. 4 is a flowchart of one embodiment of calibrating a robotic cell.

FIG. 4 is a flowchart of one embodiment of calibrating a robotic cell. The process starts at block 410.

At block 415, a calibration paddle is attached to the end of arm element. In one embodiment, the calibration paddle is a shape held by the end of arm that includes one or more fiducials.

At block 420, the calibration recipe is retrieved. In one embodiment, the calibration recipe is based on the configuration of the robotic cell and identifies the sensors and systems within the robotic cell for calibration.

At block 435, the calibration recipe is run for automated data capture. The output of the run is a calibration report. At block 440, the calibration report is reviewed. In one embodiment, this review is automatically performed by the machine learning system. In one embodiment, the report is reviewed by a technician. In one embodiment, an initial review is automatic, and if there is any issue, the report with the flagged issue is forwarded to a technician.

At block 445, the process determines whether the calibration report is accurate, and indicates that there are no calibration issues. If so, the process continues to block 460.

If the calibration report is not accurate, or a calibration issue is identified, at block 445, the process continues to block 450. At block 450, an automatic and/or manual correction tools are applied to correct the issues. This may include selecting an alternative calibration recipe, adjusting configuration of elements within the robotic cell, etc. In one embodiment, the calibration report indicates the issue, and automatic correction approaches are first attempted, before stopping the process and requesting a technician to address the issue. Once the issue has been addressed, the process returns to block 435, to re-run the calibration recipe.

At block 460, the tool center point (TCP) is calibrated, and a calibration report is generated. At block 465, the process determines whether the calibration report is accurate, and accurately indicates the TCP. If so, the process continues to block 475. Otherwise, at block 470, automated and/or manual correction tools are used to address the issue. The process then returns to block 460 to recalibrate the TCP and rerun the calibration report.

At block 475, the cell calibration is verified, and the calibration report is reviewed. In one embodiment, the calibration is verified by using the calibration data to do a DIP test, which partially inserts components to verify that the calibration is accurate and the positioning of each of the commands is accurate for inserting the elements. At block 480, the accuracy of the calibration is reviewed. If the report indicates it is not accurate, at block 485 the automated/manual correction tools are applied, and the process returns to block 475 to reverify.

If all of the calibration reports are indicated as accurate, the final calibration report is completed at block 490, and the process ends at block 495. The robotic cell is then ready for use.

Figure 5:
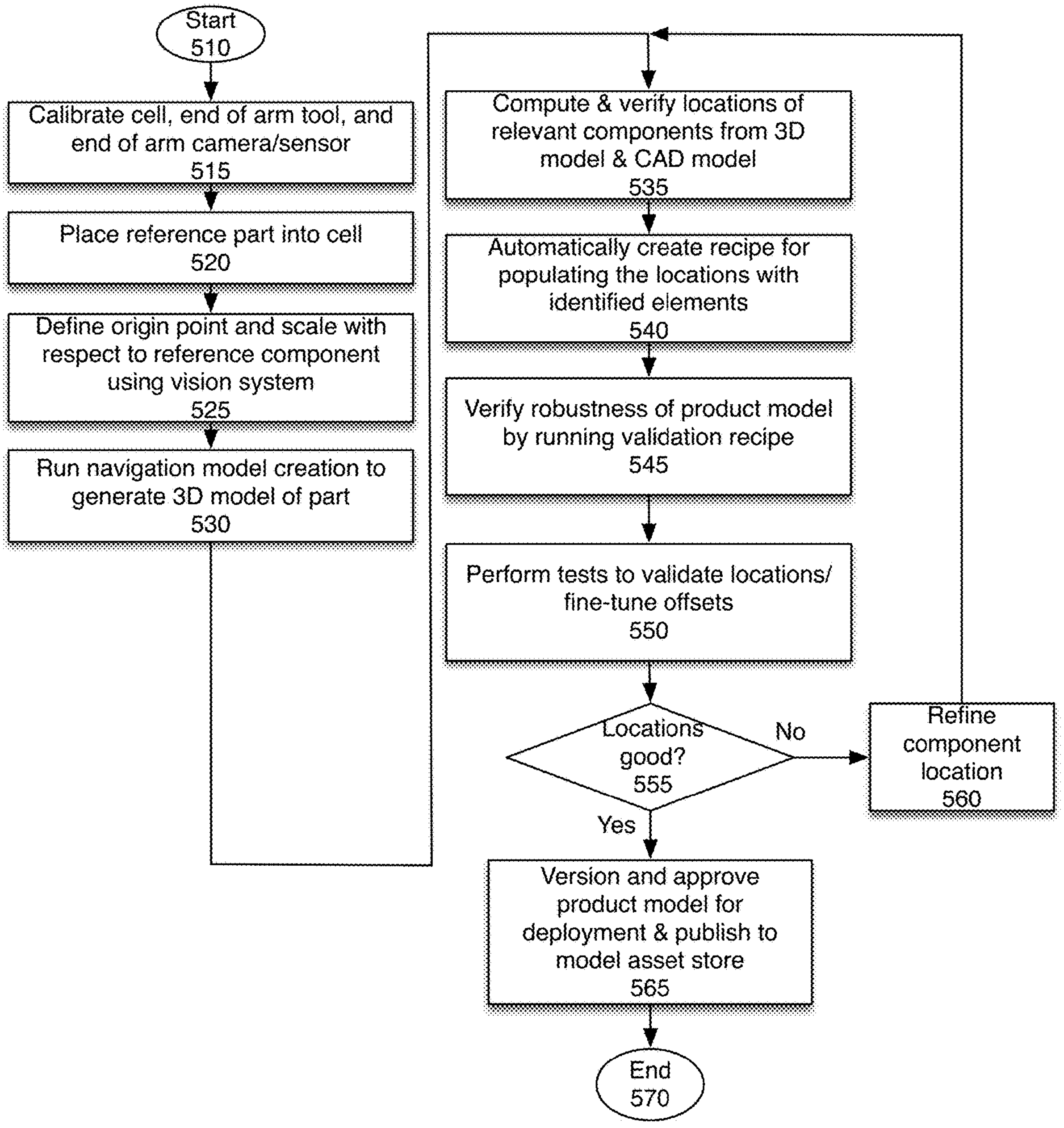
FIG. 5 is a flowchart of one embodiment of generating a product model.

FIG. 5 is a flowchart of one embodiment of generating a product model. The process starts at block 510.

At block 515, the robotic cell, end of arm tool, and end of arm camera/sensors are calibrated.

At block 520, a reference part is placed into the cell. The reference part is the "golden device" which is used to create the product model. In one embodiment, the reference part is a standard component, which has been verified to ensure that it is not warped or otherwise imperfect.

At block 525, the system defines a reference component on the reference part, which defines the origin point for the reference part. In one embodiment, a fiducial is attached to the reference part and the fiducial is used to place the origin point. In another embodiment, an existing structure on the reference component may be used as the origin point. For example, a corner element of a DIMM socket, or a latch may be used. In that case, no fiducial is needed. In addition to defining the origin point, the device scale is defined. In one embodiment, the fiducial is used to define scale.

At block 530, a navigation model creation tool is run to generate a multi-dimensional model representation of the reference part. In one embodiment, the rich model representation is a sparse point cloud, a neural radiance field, or another data set representing the reference part. In one embodiment, the data may be acquired using depth sensors, image sensors, and/or other systems. In one embodiment, the system extracts image features. In one embodiment, the extraction of image features utilizes corner detection and expands around the corner to extract surrounding features. In one embodiment, this data is encoded into the model. In one embodiment, the feature descriptions are attached to the 3D model. The system in one embodiment utilizes a plurality of images taken by multiple cameras and/or sensors and matches the images to create a correlated set of images. This allows the use of a sparse point cloud, rather than a dense cloud which takes significantly more processing power and is slower.

At block 535, the locations of the relevant components are identified based on the 3D model. In one embodiment, the identification of the components based on the 3D model uses a machine learning system trained on a variety of devices. In one embodiment, the machine learning system is an object detection model, such as YOLO Real-Time Object Detection (You Only Look Once), Fast Region-Based Convolutional Network (FastRCNN), Region-Based Fully Convolutional Network (R-FCN), Single Shot MultiBox Detector (SSD), and instance segmentation models like Mask-RCNN, or another model. In one embodiment, the machine learning system also has the CAD model of the reference part. In one embodiment, the locations are verified using the CAD model. If there is a mismatch between the CAD model and the image data, in one embodiment the system obtains additional images to re-calculate the features. If a mismatch remains, in one embodiment, the system may alert a technician.

At block 540, the system automatically generates the recipe to populate the identified locations of components. As noted above the components may be for example DIMM sockets, CPU sockets, heat sink stations, etc. Once the locations of these components are identified the matched elements which are assembled into each of these locations are identified, and the recipe is created. In one embodiment, the portion of the recipe for picking up the element and moving it to the component is part of the basic recipe template, and the adjustments include the number of elements picked up, and the positioning of the end of arm tool to place and fasten if appropriate, the elements.

At block 545, the robustness of the product model is verified by running a validation recipe. A validation recipe, in one embodiment, runs the constructed recipe and moves each of the components to the designated location.

At block 550 one or more tests are performed to validate locations or fine-tune offsets. In one embodiment, one of the tests may be a DIP test which partially inserts each of the elements into the identified components. In one embodiment, the DIP test can utilize a feedback sensor to verify that the insertion is accurate. In one embodiment, the feedback sensor may be a force sensor. In one embodiment, some of the components use a force sensor, while others do not. The system uses the force signal returned by load cell while attempting to partially insert a component to determine whether or not the navigation offset is accurate. In one embodiment, the system uses feedback from the force sensor to determine unsuccessful attempts. If an attempt is unsuccessful, the system automatically adjusts the location to search for the offset to correct a location that is inaccurate. In one embodiment, the search for the offset may use a discrete spiral search, an increment by fixed delta such as 100 microns, or another method to move the position and attempt to reinsert the component. In one embodiment, the feedback sensor may be an endoscopic camera, and validation tests may utilize the endoscopic camera to detect the socket and find a relative micro-adjustment, if needed.

At block 555, the process determines whether the locations are good. In one embodiment, the locations are good if all of the partial insertions worked. If the locations are not good, as determined at block 555 the component locations are refined at block 560. As noted above, the adjustments may include an automatic search to identify the offset. In one embodiment, the process returns to block 535 to recompute the locations. In one embodiment, this process also takes a new set of images and may regenerate the 3D model of the product.

If the locations are good, at block 565, the system versions and approves the product model for deployment. The product model is then published to a model asset store. This makes it available for deployment to robotic cells. In one embodiment, the deployment may be limited to the robotic cells assembling the same product line. In another embodiment, the deployment may be broader, and available for any line on which the tested component and socket configuration exists. The process then ends at block 570.

Figure 6:
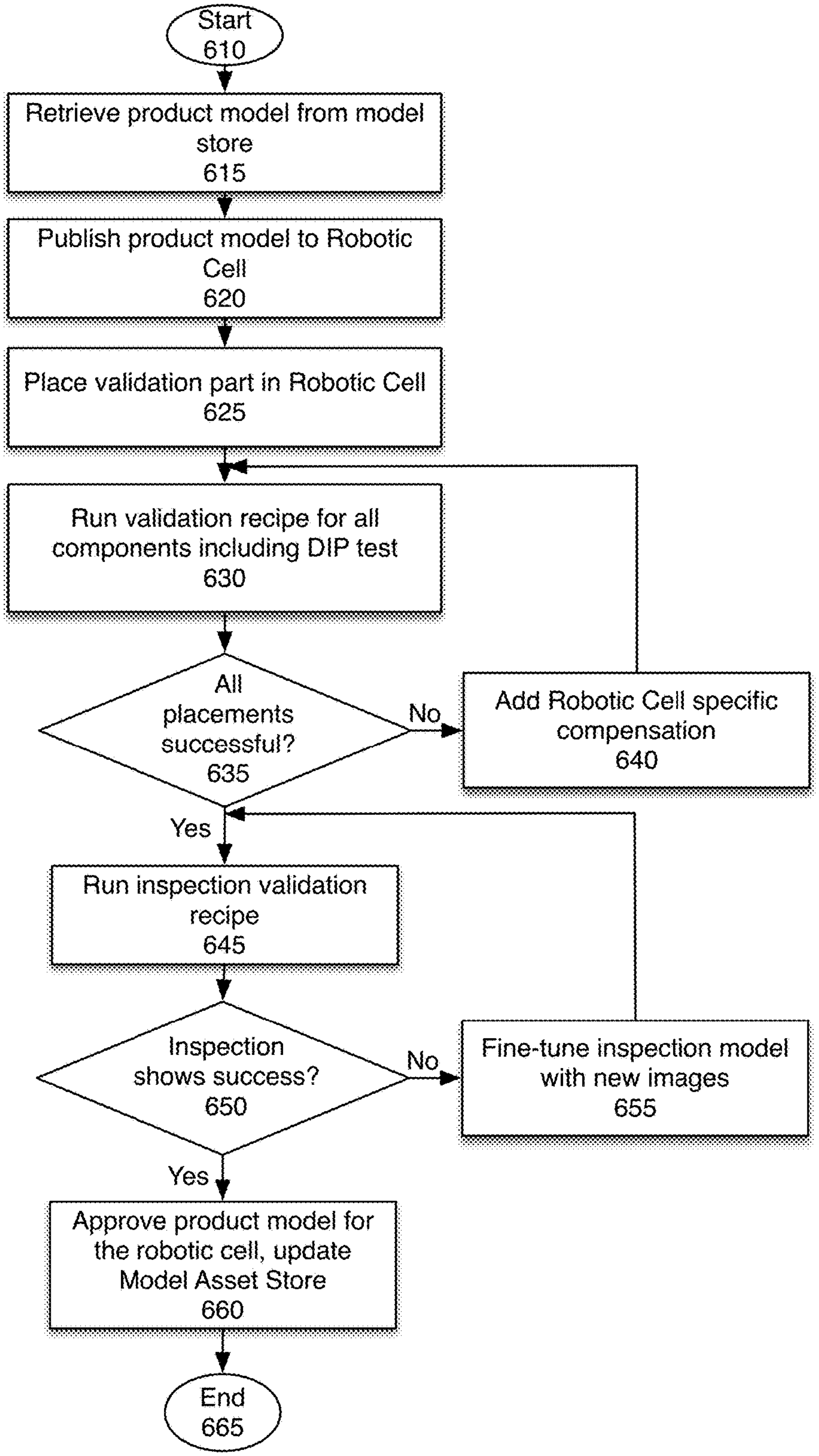
FIG. 6 is a flowchart of one embodiment of validating the product model.

FIG. 6 is a flowchart of one embodiment of validating the product model. In one embodiment, the system validates the product model for each type of robotic cell configuration. This ensures that the product model will be able to be run on the robotic cell type. In one embodiment, the model asset store identifies for each product model the robotic cell configurations which have been validated for use with the product model. The process starts at block 610. The process at block 615 retrieves the product model from the model store.

At block 620, the model is published to the robotic cell. In one embodiment, the robotic cell is calibrated before the product model is introduced.

At block 625, a reference sample is placed in the robotic cell. In one embodiment, the reference sample is a known good version of the device for assembly.

At block 630, the validation recipe is run for all components. As noted above, in one embodiment the validation recipe utilizes a partial insertion, or DIP test, of a part into the component at the identified locations on the reference sample. In one embodiment, the validation receives feedback from a feedback sensor.

At block 635, the process determines whether all placements were successful. If one or more placements were not successful, at block 640, robotic cell specific compensation is added to the positions of one or more elements. The compensation, in one embodiment, is designed to address projection errors, skew or other issues. In one embodiment, bundle adjustments are applied to refine extrinsic parameters. Because the system utilizes 2D images or 3D scans to map to a 3D object, in one embodiment, the system applies the adjustment to minimize reprojection errors, due to the extrinsic parameters (the positioning of cameras/sensors). In one embodiment, the actual compensation, or off-set is determined based on data from the feedback sensor. For a force sensor, in one embodiment the system attempts insertion and if the force sensor indicates that the position is incorrect (e.g., the force level is too high, which indicates that the component and the socket are not correctly aligned), the system determines the device-specific offset. In one embodiment, a spiral search pattern is used to figure out the correct position, with re-testing at a plurality of locations. In another embodiment, the feedback sensor is an endoscopic camera on the end-of-arm element, and the system calculates the cell-specific compensation based on the image offset. The process then returns to block 630 to re-run the validation recipe.

If the placements were all successful, at block 645, inspection validation recipe is run. Inspection validation verifies after insertion that each of the elements were successfully inserted into the components of the reference sample.

At block 650, the process determines whether the inspection shows success or failure. If the inspection fails, the system is fine-tuned by adding more images, at block 655. In one embodiment, the region of interest is refined before more images are added. The process then returns to block 645, to re-run the inspection validation recipe. If the inspection validation recipe is successful, the process continues to block 660.

At block 660, the product model is approved from the particular robotic cell configuration on which this validation was completed. The model asset store is updated to release the product model, indicating that this robotic cell configuration has been validated for the product model. This means that the product model is available for robotic cells with the identified configuration. The process then ends at block 665.

Figure 7:
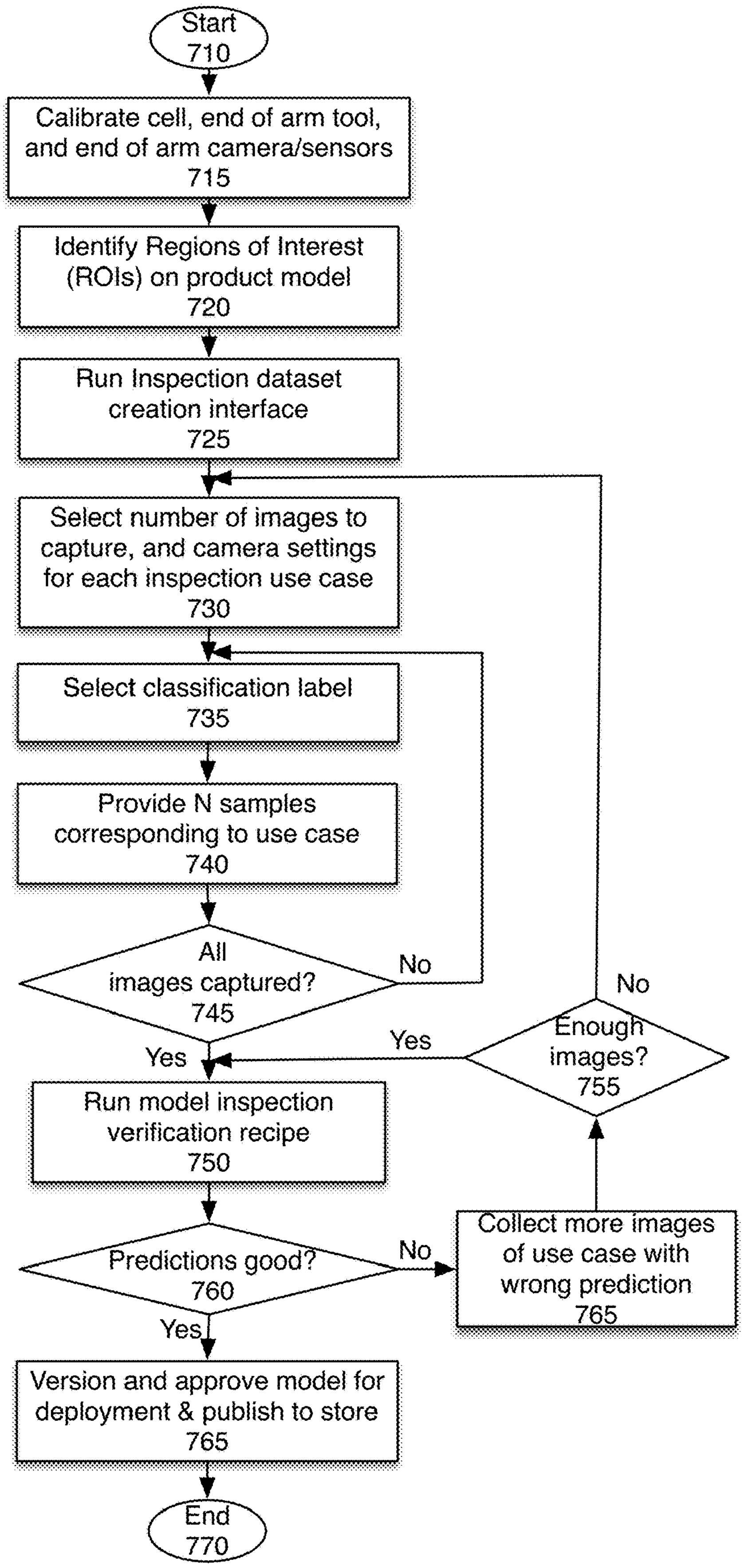
FIG. 7 is a flowchart of one embodiment of creating and training the inspection verification.

FIG. 7 is a flowchart of one embodiment of creating and training the inspection verification. The process starts at block 710.

At block 715, the cell, end-of-arm tool, and cameras/sensors are calibrated.

At block 720, template regions of interest (ROIs) are identified. The template is of the base or component into which the elements are inserted. In one embodiment, the regions of interest are defined around the identified component locations where elements will be inserted/attached. In one embodiment, a sparse 3D model labeled with identified locations is used for identifying the regions of interest.

At block 725, an inspection dataset creation interface is run. The interface automatically finds the regions of interest and annotates and allows the user to label them.

At block 730, a number of images to capture and camera settings for each inspection use case are selected. In one embodiment, the system determines how many images and in what positions are needed to ensure that the inspection will result in accurately identifying any errors in the assembly.

At block 735, a classification is selected.

At block 740, the system receives N samples corresponding to the use cases for the classification selected. The N samples are the verification samples, which are separate from the training samples which were used to train the machine learning system to identify the various types of issues.

At block 745, the process determines whether all images have been captured. If not, the process returns to block 735. Otherwise, the process continues to block 750.

At block 750, the model inspection verification recipe is run. In one embodiment, the model inspection verification utilizes a testing model in which known defects are introduced to confirm that the inspection model is able to detect those defects.

At block 760, the process determines whether the predictions are accurate. If not, more images are collected for the use case with the inaccurate prediction. The images, and the inaccurate prediction, are used to further train the machine learning system. At block 755 the process determines whether enough images have been captured of the incorrectly predicted issue. If so, after retraining, the model inspection verification recipe is run again at block 750. If there are not yet enough images, the process returns to block 730, to update the number of images to capture & capture the images.

If the predictions were accurate, the model inspection verification recipe is approved for deployment, at block 765. The process then ends at block 770.

Figure 8:
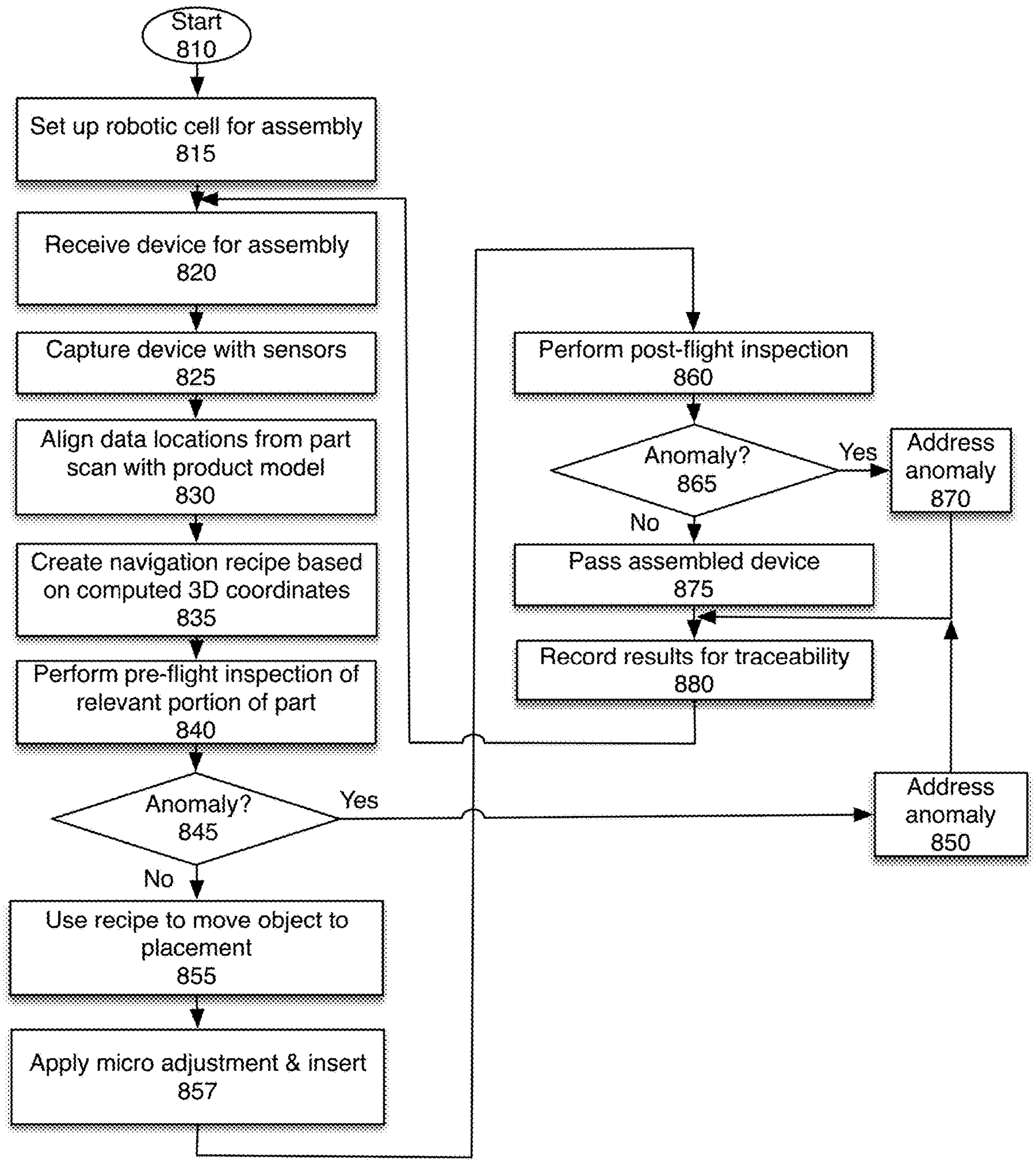
FIG. 8 is a flowchart of one embodiment of using the product model for assembly of devices.

FIG. 8 is a flowchart of one embodiment of using the product model for assembly of devices. The process starts at block 810. The process starts when the first component is made available to the robotic cell for assembly.

At block 815, the robotic cell is set up for assembly. This includes calibrating the robotic cell and uploading a product model to the robotic cell. In one embodiment, the auto-calibration calibrates the robotic cell, tool center point, etc.

At block 820, the device for assembly is received. This is the product base, or device, into which one or more elements will be inserted.

At block 825, the device data is captured with sensors. In one embodiment, the capturing uses a plurality of images of the part, such images may include photographic images, X-ray images, 3D scan images.

At block 830, the data locations from the device capture are aligned with the product model. This defines the location of the device and its components in the robotic cell. In one embodiment, a sparse point cloud is used for the alignment.

At block 835, a navigation recipe is created based on the computed 3D coordinates of the elements for assembly in this robotic cell.

At block 840, the system performs a pre-flight inspection of the relevant portion of the device. In one embodiment, the pre-flight inspection utilizes the images obtained at block 825 to confirm that there are no issues with the device. In one embodiment, the pre-flight inspection may be per component, may be per insertion location, may be for the relevant portions of the device for this robotic cell, or may be for the whole device, such as an entire server board. The pre-flight inspection ensures that the latches are open, there are no wires or other parts that do not belong across the relevant portion of the device. In one embodiment, the defined regions of interest for the recipe to be applied by this robotic cell are used in this pre-flight inspection. Some of the exemplary pre-flight inspection errors that may be found include components on the device that are not supposed to be there, socket pin anomalies, over-torqued screw heads, socket latches open/closed, etc.

At block 845, the process determines whether an anomaly is detected. If so, at block 850 the anomaly is addressed. In one embodiment, the anomaly may be addressed automatically, if the anomaly is the result for example of the end of arm tool obscuring a portion of the images, or a latch being closed that can be automatically opened. Some anomalies require a technician to address. The process then continues to block 880, to record the results to provide traceability. In one embodiment, the traceability provides time stamped data for root cause analysis. The process then returns to block 820, to re-attempt assembly of the device. In one embodiment, the system may attempt to assemble the same device if the anomaly was addressed. However, in one embodiment, the device may be discarded after multiple attempts.

If no anomalies are detected, at block 855 the recipe is used to move the component to the location for assembly.

At block 857, in one embodiment, micro-adjustments are applied, and the component is inserted into the socket or other location. The micro-adjustments in one embodiment are computed by a feedback sensor. In one embodiment, the feedback sensor is a force sensor coupled with a 1D or 2D spiral search to locate the accurate position if an initial positioning is inaccurate. In one embodiment, the feedback sensor is an endoscopic camera, and the micro-adjustments are computed using data from the endoscopic camera. In one embodiment, if micro-adjustments are made during an insertion, a navigation offset for the robotic cell is adjusted for future insertions, based on the micro-adjustment. In one embodiment, this is used to address vision drift over time.

At block 860, a post-flight inspection is performed. The post-flight inspection inspects those portions of the device that were touched by the assembly process, e.g., if the robotic cell inserts DIMMs, each of the DIMMs and filled DIMM sockets are inspected. But if the robotic cell only inserts a processor, only the processor socket is inspected, in one embodiment. This provides a closed loop automation system with integral inspection.

At block 865, the process determines whether an anomaly was identified. If so, the anomaly is addressed at block 870. If the anomaly is for example a latch not closed, or a DIMM not correctly or fully inserted, or a DIMM missing, the system may return to block 855 and re-execute a portion of the recipe. The process then continues to block 880 to record the results.

If there is no anomaly the process continues to block 875, and the assembled device is passed, having been successfully assembled using the recipe. The process then continues to block 880 to record the results, and the record of the part is stored to provide traceability. In one embodiment, if a subsequent error is identified that was not caught by the pre-flight or post-flight inspections, having the traceability data enables retraining of the system, based on later identified issues.

If there are more devices to assemble, the process may return to block 820, to pull a new device into the system for assembly. The process otherwise ends at block 880, if there are no further devices for assembly.

Of course, though FIGS. 3-8 are shown as flowcharts, in one embodiment the order of operations is not constrained to the order illustrated, unless the processes are dependent on each other. Furthermore, in one embodiment the system may be implemented as an interrupt-driven system, and thus the system does not check for an occurrence, but rather an occurrence or detection of status sends a notification to trigger actions.

Figure 9:
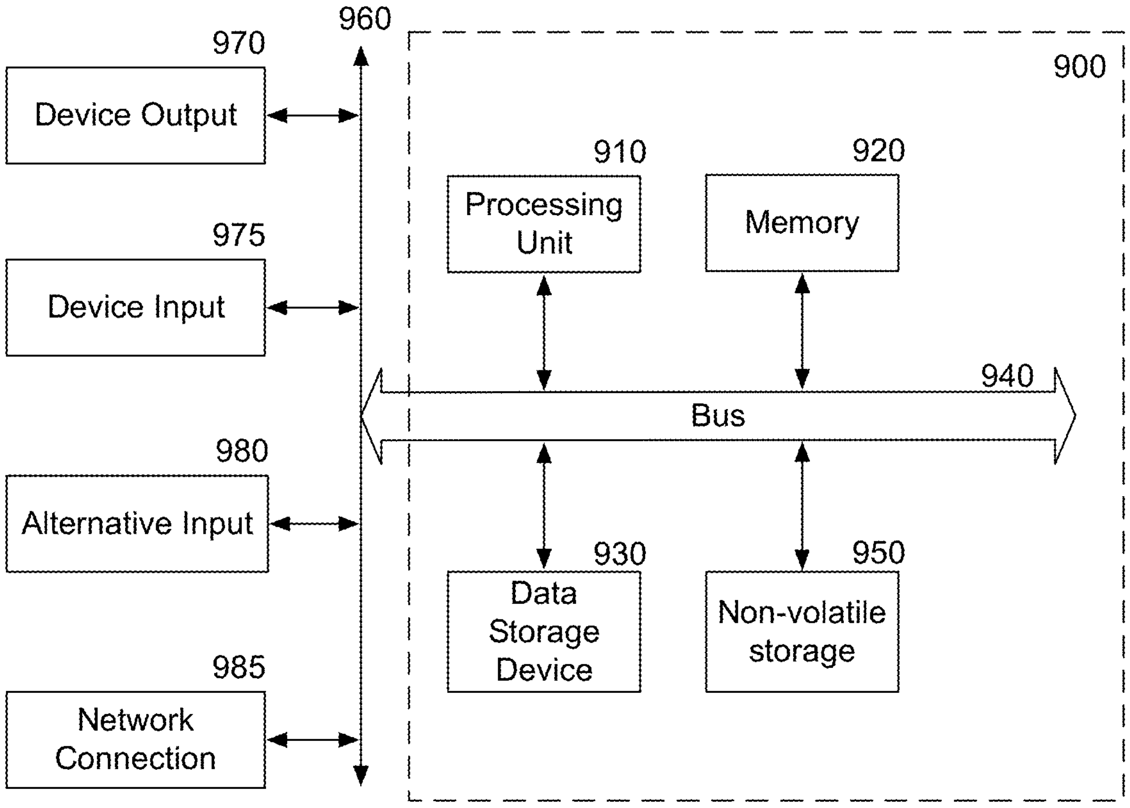
FIG. 9 is a block diagram of one embodiment of a computer system that may be used for programless assembly.

FIG. 9 is a block diagram of one embodiment of a computer system that may be used for programless assembly. It will be apparent to those of ordinary skill in the art, however that other alternative systems of various system architectures may also be used.

The computer system illustrated in FIG. 9 includes a bus or other internal communication means 940 for communicating information, and a processing unit 910 coupled to the bus 940 for processing information. The processing unit 910 may be a central processing unit (CPU), a digital signal processor (DSP), graphics processor (GPU), or another type of processing unit 910.

The system further includes, in one embodiment, a memory 920, which may be a random access memory (RAM) or other storage device 920, coupled to bus 940 for storing information and instructions to be executed by processor 910. Memory 920 may also be used for storing temporary variables or other intermediate information during execution of instructions by processing unit 910.

The system also comprises in one embodiment a read only memory (ROM) 950 and/or static storage device 950 coupled to bus 940 for storing static information and instructions for processor 910.

In one embodiment, the system also includes a data storage device 930 such as a magnetic disk or optical disk and its corresponding disk drive, or Flash memory or other storage which is capable of storing data when no power is supplied to the system. Data storage device 930 in one embodiment is coupled to bus 940 for storing information and instructions.

In some embodiments, the system may further be coupled to an output device 970, such as a computer screen, speaker, or other output mechanism coupled to bus 940 through bus 960 for outputting information. The output device 970 may be a visual output device, an audio output device, and/or tactile output device (e.g., vibrations, etc.)

An input device 975 may be coupled to the bus 960. The input device 975 may be an alphanumeric input device, such as a keyboard including alphanumeric and other keys, for enabling a user to communicate information and command selections to processing unit 910. An additional user input device 980 may further be included. One such user input device 980 is cursor control device 980, such as a mouse, a trackball, stylus, cursor direction keys, or touch screen, may be coupled to bus 940 through bus 960 for communicating direction information and command selections to processing unit 910, and for controlling movement on display device 970.

Another device, which may optionally be coupled to computer system 900, is a network device 985 for accessing other nodes of a distributed system via a network. The communication device 985 may include any of a number of commercially available networking peripheral devices such as those used for coupling to an Ethernet, token ring, Internet, or wide area network, personal area network, wireless network, or other method of accessing other devices. The communication device 985 may further be a null-modem connection, or any other mechanism that provides connectivity between the computer system 900 and the outside world.

Note that any or all of the components of this system illustrated in FIG. 9 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 920, mass storage device 930, or other storage medium locally or remotely accessible to processor 910.

It will be apparent to those of ordinary skill in the art that the system, method, and process described herein can be implemented as software stored in main memory 920 or read only memory 950 and executed by processor 910. This control logic or software may also be resident on an article of manufacture comprising a computer readable medium having computer readable program code embodied therein and being readable by the mass storage device 930 and for causing the processor 910 to operate in accordance with the methods and teachings herein.

The present invention may also be embodied in a special purpose appliance including a subset of the computer hardware components described above, such as a robotic cell. For example, the appliance may include a processing unit 910, a data storage device 930, a bus 940, and memory 920, and no input/output mechanisms, or only rudimentary communications mechanisms, such as a small touchscreen that permits the user to communicate in a basic manner with the device. In general, the more special purpose the device is, the fewer of the elements need be present for the device to function. In some devices, communications with the user may be through a touch-based screen, or similar mechanism. In one embodiment, the device may not provide any direct input/output signals but may be configured and accessed through a website or other network-based connection through network device 985.

It will be appreciated by those of ordinary skill in the art that any configuration of the particular machine implemented as the computer system may be used according to the particular implementation. The control logic or software implementing the present invention can be stored on a machine-readable medium locally or remotely accessible to processor 910. A machine-readable medium includes any mechanism for storing information in a form readable by a machine (e.g., a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical, or other forms of propagated signals (e.g., carrier waves, infrared signals, digital signals, etc.).

Furthermore, the present system may be implemented on a distributed computing system, in one embodiment. In a distributed computing system, the processing may take place on one or more remote computer systems. The system may provide local processing using a computer system 900, and further utilize one or more remote systems including some or all of the elements of computer system 900 for storage and/or processing. In one embodiment, the present system may further utilize distributed or cloud computing. In one embodiment, the computer system 900 may represent a client and/or server computer on which one or more applications are executed to perform the methods described above. Other configurations of the processing system executing the processes described herein may be utilized without departing from the scope of the disclosure.

In the foregoing specification, the programless assembly system and method has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative rather than a restrictive sense.

We claim:

1. A method of automated assembly of a device using a robotic cell comprising:

calibrating a robotic cell for generating a product model, the robotic cell including an end-of-arm sensor;

utilizing the robotic cell to generate the product model of the device for assembly;

validating the product model using a partial assembly method;

verifying robustness of the product model using the partial assembly method, the partial assembly method comprising partially inserting assembly elements into computed locations, without complete insertion, such that navigation to, and insertion of, an element at an incorrect location does not damage the device or the assembly element; and making the product model available for use by robotic cells for navigation, validation, and/or inspection.

2. The method of claim 1, wherein generating the product model comprises:

identifying a reference point on the device and device scale;

running a model creation client to create a 3D model representation of the device;

computing locations of components from the reference point;

verifying the computed locations of the components using a computer aided design (CAD) model of the device.

3. The method of claim 2, wherein the reference point comprises a fiducial on a component.

4. The method of claim 2, wherein generating the product model further comprises:

verifying robustness of the product model using the partial assembly method.

5. The method of claim 1, further comprising:

the product model of the device including one or more computed locations where assembly elements will be inserted;

wherein the partial assembly method comprises partially inserting the assembly element into corresponding each of the computed locations on the device, based on the product model of the device, without complete insertion, such that navigation to, and insertion of, the assembly element at an incorrect location does not damage the device or the assembly element.

6. The method of claim 4, further comprising:

when the partial assembly method indicates a mismatch, apply a robotic cell specific compensation to the product model and re-attempting the verifying.

7. The method of claim 1, further comprising:

using a feedback sensor to fine-tune navigation offsets, the feedback sensor comprising one or more of: a force sensor and an endoscopic camera.

8. The method of claim 7, wherein the feedback sensor is used for one or more of: fine-tuning navigation offsets, applying micro-adjustments to an estimated position during an assembly step, and applying offsets to compensate for vision drift during a production process.

9. The method of claim 1, further comprising performing an inspection of the product model comprising:

identifying regions of interest;

taking a plurality of images of the regions of interest;

performing model inspection verification on the images to verify location predictions;

determining that the location predictions are correct and approving the product model for deployment.

10. The method of claim 9, wherein when the location predictions are not correct, images with the incorrect prediction are collected and used to improve the predictions by training a machine learning system.

11. The method of claim 1, further comprising:

uploading the product model to a second robotic cell having a particular configuration;

running the partial assembly method for all components;

inspecting the device; and when the partial assembly method and the inspecting show that the assembly was successful, approving the product model for use by the robotic cells having the particular configuration.

12. The method of claim 11, further comprising:

when the inspecting ends in a failure, refining regions of interest and taking additional images of the refined region of interest.

13. A system to enable automated assembly of a device using a robotic cell comprising:

calibrator to calibrate a robotic cell the robotic cell including an end-of-arm sensor;

a processor to implement a product model generator to generate the product model of the device for assembly; and a validator to validate the product model using a partial assembly method, the partial assembly method comprising partially inserting assembly elements into computed locations, without complete insertion, such that navigation to, and insertion of, an element at an incorrect location does not damage the device or the assembly element.

14. The system of claim 13, wherein the product model generator is further to:

identify a reference point on the device and device scale;

run a model creation client to create a 3D model representation of the device;

compute locations of components from the reference point;

verify the computed locations of the components using a computer aided design (CAD) model of the device.

15. The system of claim 14, wherein the reference point comprises a fiducial on a component.

16. The system of claim 13, further comprising:

an inspector to perform an inspection of the product model comprising:

identifying regions of interest;

taking a plurality of images of the regions of interest;

performing model inspection verification on the images to verify accuracy of location predictions;

determining that the predictions are correct and approving the product model for deployment.

17. The system of claim 16, wherein when the predictions are not correct, images with the incorrect prediction are collected and used to improve the predictions by training a machine learning system.

18. The system of claim 16, further comprising, the inspector further to add more images and refining the region of interest, when one or more of the inspections end in a failure.

19. The system of claim 13 further comprising:

a feedback sensor to fine-tune navigation offsets, the feedback sensor comprising one or more of: a force sensor and an endoscopic camera, wherein the feedback sensor is used for one or more of: fine-tuning navigation offsets, applying micro-adjustments to an estimated position during an assembly step, and applying offsets to compensate for vision drift during a production process.

20. A method of automated assembly of a device using a robotic cell comprising:

calibrating a robotic cell for generating a product model, the robotic cell including an end-of-arm sensor;

utilizing the robotic cell to generate the product model of the device for assembly, the product model including a plurality of regions of interest, each of the regions of interest corresponding to an area for component insertion during the assembly;

validating the product model using a physical validation by partial insertion of an element into each of the areas;

adding robotic cell specific compensation, based on the validating;

verifying robustness of the product model using the partial assembly method, the partial assembly method comprising partially inserting assembly elements into computed locations, without complete insertion, such that navigation to, and insertion of, an element at an incorrect location does not damage the device or the assembly element;

performing a final inspection of the product model; and releasing the product model.

* * * * *